United States Patent [19]

Longo et al.

[11] Patent Number: 4,833,921

[45] Date of Patent: May 30, 1989

[54] GAS PRESSURE MEASUREMENT DEVICE

[75] Inventors: Robert T. Longo, Arcadia; Edward A. Adler, Culver City, both of Calif.

[73] Assignee: Hughes Aircraft Company, Los Angeles, Calif.

[21] Appl. No.: 190,700

[22] Filed: May 5, 1988

[51] Int. Cl.$^4$ .............................. G01L 9/00
[52] U.S. Cl. .................................... 73/753
[58] Field of Search ......................... 73/753; 324/463

[56] References Cited

U.S. PATENT DOCUMENTS 2,966,799  1/1961  Ball ............................ 73/753

FOREIGN PATENT DOCUMENTS 0593097  2/1978  U.S.S.R. ..................... 324/463

OTHER PUBLICATIONS

J. H. Maimberg, et al., "Long-Time Containment of a Pure Electron Plasma", Physical Review Letters, vol. 44, No. 10, Mar. 10, 1980, pp. 654-657.

*Primary Examiner*—Donald O. Woodiel
*Attorney, Agent, or Firm*—Terje Gudmestad; Karambelas A. W.

[57] ABSTRACT

Apparatus for measuring gas pressures in vacuum type devices such as traveling-wave tubes is disclosed including an elongated hollow tube with negatively biased electrodes at each end. An axial magnetic field is induced in the chamber, and electrons are injected into the chamber and caused to travel in a confined beam substantially longitudinally between the two electrodes. Electrons will randomly hit gas molecules within the chamber and be deflected outwardly in stepped fashion to the wall of the tube. Electrons impinging upon the tube wall form a current dependent upon the gas pressure within the chamber. A current meter attached to the tube and calibrated as a function of pressure indicates the gas pressure.

18 Claims, 2 Drawing Sheets

GAS PRESSURE MEASUREMENT DEVICE

The Government has rights in this invention pursuant to Contract No. F33615-86-C-1142 awarded by the Department of the Air Force.

BACKGROUND OF THE INVENTION

1. Field of the Invention

This invention relates generally to measurement of gas pressures and more particularly to gas pressure measurement devices used with vacuum-type devices.

2. Description of Related Art

Many electronic devices today employ evacuated chambers, such as traveling-wave tubes, klystrons, multipactors and plasma generators, for example. These vacuum-type electronic devices require that undesired foreign gases be limited to prescribed amounts for the particular device to operate efficiently. For example, a traveling-wave tube is evacuated to a pressure typically of less than about $10^{-8}$ torr. A traveling-wave tube typically includes an evacuated chamber wherein a cathode generated electron beam which interacts with a wave traveling along a slow-wave structure, transfering energy to the wave. If the chamber should leak, atoms or molecules of any gas entering the chamber will collect on the surface of the cathode while the device is in a storage, or "off", condition. The accumulation of foreign matter on the cathode may cause sluggish turn-on performance or even a failure to turn on at all. Vacuum-type devices often have a long shelf time and therefore are susceptable to contamination and consequently failure at turn-on, particularly vacuum devices requiring fast turn on. Furthermore, vacuum-type devices such as traveling-wave tubes, klystrons, and plasma generators are typically employed in aircraft or spacecraft in which failures could be difficult if not impossible to remedy. Accordingly, sluggish turn-on or failure to turn on could lead to the failure of an entire system that employs such vacuum devices.

Therefore, an accurate and easy to use pressure measurement device is needed to screen vacuum devices for contamination before they are switched on. Devices have been developed to measure the pressure in vacuum-type devices. The devices available, however, are typically large and cumbersome or employ high-speed circuitry or high voltage to operate. For example, the Bayard Alpert gauge is a conventional pressure gauge. However, this gauge is not compact because of its characteristic geometry. Additionally, this gauge uses high voltages which generate x-rays that interfere with the pressure sensitive signal. A simple compact device to determine gas pressure in evacuated devices would greatly advance the art.

Additional background of interest may be found in an article by J. H. Malmberg and C. F. Driscoll, "Long-Time Containment of a Pure Electron Plasma", Vol. 44, No. 10, Physical Review Letters 654–57 (Mar. 10, 1980). This article discloses an arrangement designed to contain a single species plasma for studying a wide variety of plasma phenomena. Plasma is held for a variable time t within a grounded cylinder between negatively biased gating rings. After time t, one of the gating rings is gated to ground and the plasma exits the cylinder. The total charge remaining after time t is measured (upon exiting) to determine how much of the plasma was lost during confinement. Experimental results on long time containment of a pure electron plasma is reported in this article. This article, however, has nothing to do with measuring gas pressure or an arrangement to measure gas pressure.

SUMMARY

It is therefore an object of this invention to provide a measurement device to monitor gas pressure in vacuum-type devices that is much simpler than those available in the prior art.

It is a further object of this invention to provide a gas pressure measurement device that is compact.

It is still a further object of this invention to provide a gas pressure measurement device that operates with low voltages.

A gas pressure measurement device according to the present invention includes an electrically conductive tube with electrically isolated electrodes at each end. A magnet mounted about the tube introduces a magnetic field therein essentially parallel to the tube axis. Both electrodes are negatively biased with respect to a cathode which injects electrons into the tube. The electrons travel between the negatively biased electrodes along the magnetic field lines. Electrons traveling back and forth within the tube randomly collide with gas molecules within the tube, and some of the electrons are directed radially outwardly to the wall of the tube. Electrons infringe upon the conductive tube in relation to the number of gas molecules present within the tube (hence gas pressure). The impinging electrons from a DC current which is measured by a meter calibrated according to the gas pressure.

Other and further objects, advantages and characteristic features of the present invention will become readily apparent from the following detailed description of preferred embodiments of the invention when taken in conjunction with the appended claims.

DETAILED DESCRIPTION OF PREFERRED EMBODIMENTS

Figure 1:
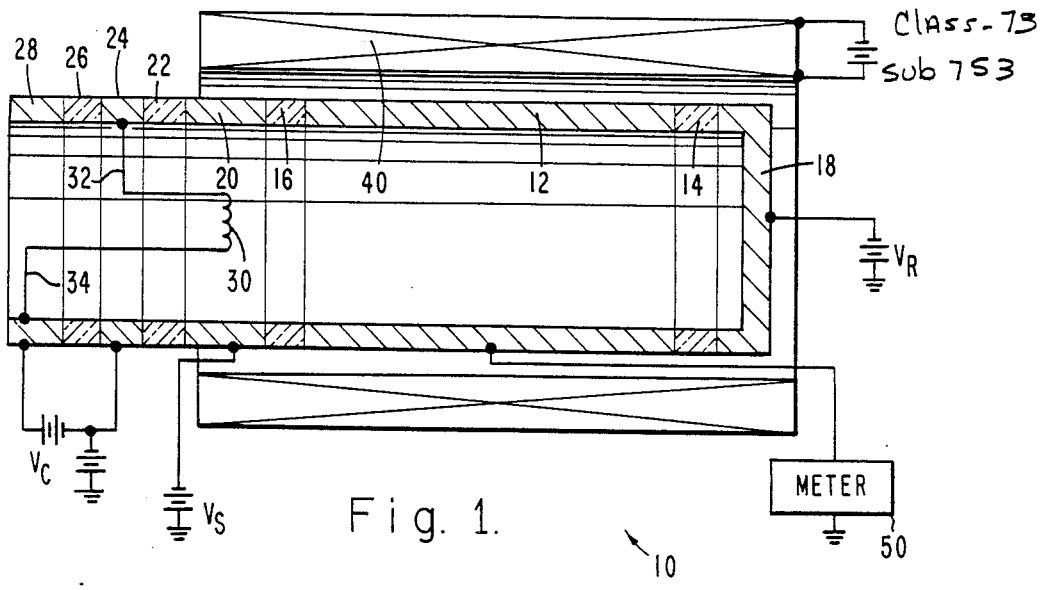
FIG. 1 is a cross-sectional view of a gas pressure measurement device in accordance with the invention.

Referring now with greater particularity to FIG. 1, there is shown a tubular body 12 having a hollow chamber therethrough. The tubular body 12 is typically made of metallic material such as molybdenum or stainless steel, for example, which are nonmagnetic and have low outgassing properties and therefore are compatible with high vacuum environments. First and second insulator rings 14 and 16, which may be made of ceramic material with metallized end surfaces, are attached to each end of tubular body 12 by brazing, for example. One end of the tubular body 12 is closed off by reflector end cap 18. Reflector end cap 18 is also made of nonmagnetic low outgassing conductive material such as molybdenum or stainless steel and is attached to the other metallized end surface of insulator ring 14, by brazing for example. Reflector end cap may be cup-shaped as illustrated in FIG. 1 or alternatively may be a flat disk-shaped plate or a disk-shaped screen, for example.

Toward the other end of the tubular body, shield member 20 is attached to the other metallized end surface of insulator ring 16. Shield member 20 is also made of nonmagnetic low outgassing conductive material. A third insulator ring 22, which may be made of ceramic material with metallized end surfaces, is attached to the other end of shield member 20, by brazing for example. A first ring-shaped cathode heater electrode member 24 made of a metallic material is attached to the metallized end surface of the third insulator ring 22 by brazing, for example. A fourth insulator ring 26 also made of ceramic material having metallized end surfaces is attached to the other end of the first cathode heater electrode member 24 by brazing, for example. A second ring-shaped cathode electrode member 28 of metallic material is attached to the other metallized end surface of the fourth insulator ring 26, typically by brazing.

A thermionic emission cathode 30 is located within shield member 20. Cathode 30 may be a typical dispenser cathode, or thoriated tungsten cathode, both well-known in the art, which generally has a heating element therein for inducing emission of electrons from the cathode. Leads 32 and 34 from the cathode 30 are electrically connected to the first and second cathode heater electrode members 24 and 28 by welding or brazing, for example. The cathode leads 32 and 34 may be in the form of electrodes which also provide the mechanical support to hold cathode 30 at about the axis of tubular body 12. The emitting surface of cathode 30 faces toward the hollow chamber defined by the tubular body 12. Voltage source $V_c$ supplies current to the cathode 30 for inducing electron emission therefrom the voltage across the cathode typically being $-20$ volts or more.

A negative voltage, indicated by $V_r$, and which may be about $-20$ volts with respect to the cathode, for example, is applied to the reflector end cap 18. Since the voltage $V_r$ is negative and the electrical potential of the electrons emitted by cathode 30 is negative, electrons traveling toward reflector end cap 18 are therefore repelled back into the hollow chamber of tubular body 12. A negative voltage, indicated by $V_s$, is applied to shield member 20. The voltage $V_s$ is preferably less negative than the voltage $V_r$ applied to the reflector end cap 18. Accordingly, the voltage on shield member 16 may be about $-15$ volts with respect to the cathode, for example. Shield member 16 keeps electrons in the hollow chamber of tubular body 12.

A magnet 40 is disposed about tubular body 12, and may be a solenoid magnet, for example. Magnet 40 generates an axial magnetic field through the hollow chamber of the tubular body 12. A current meter 50 is electrically coupled to the wall of tubular body 12.

Figure 2:
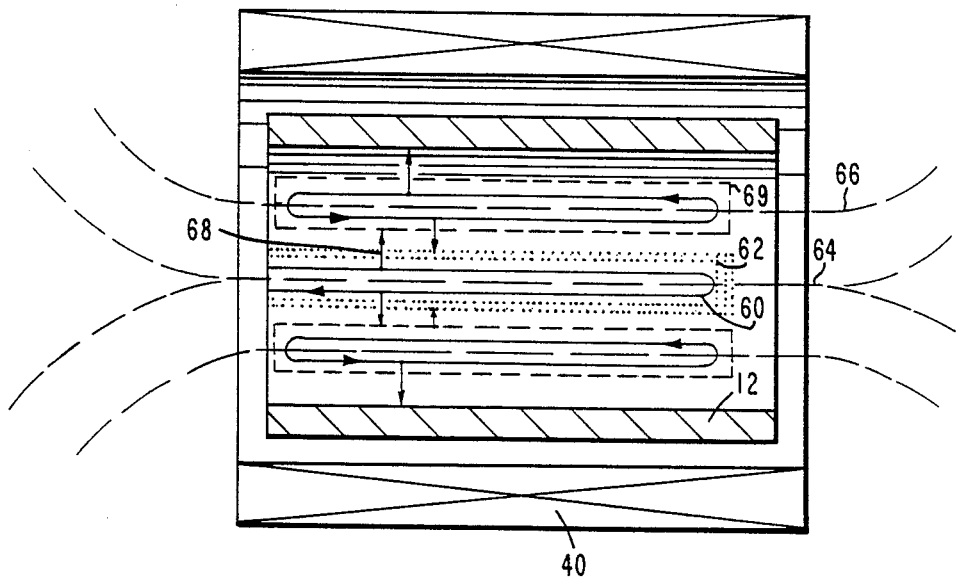
FIG. 2 is a partial sectional view of the device illustrated in FIG. 1 schematically showing electron trajectories during operation of the device.

The operation of the device depicted in FIG. 1 for explanatory purposes is shown in simplified schematic form in FIG. 2. Cathode 30 ( in FIG. 1) emits electrons which enter the hollow chamber of tubular body 12 and form a beam of electrons 60 which travel axially toward reflector end cap 18, but which are repelled back toward the cathode 30 before reaching the reflector end cap 18. Furthermore, these electrons are held within a radially confined region 62 by the magnetic field in the radially inner region as represented by line 64. The electron trajectories are shown in FIG. 2 to be straight for illustrative purposes only, but the electrons actually move in a spiral fashion about their longitudinal direction of their travel within the body 12.

Electrons 60 in the confined beam region 62 randomly hit gas atoms, molecules, or other particles present within the tubular body 12 and as a result of such collisions may be directed radially outward from the radially confined region 62. For example, electrons 68, directed outwardly from radially confined region 62, are typically captured by the magnetic field radially outwardly from the region 62 as represented by line 66. These electrons are confined to an annular confinement region 69 adjacent the field line 66. Electrons in this region travel in a spiral fashion back and forth between the ends of tubular body 12 until another collision occurs with another gas molecule which may send electrons further outward. Repeated collisions typically occur, stepping electrons further outward to other magnetic field lines until a portion of the electrons reach the tubular body 12 where they are collected and form a DC current.

In steady state operation, electrons in the central confinement region 62 continually lose electrons to the walls of the body 12 due to collisions, but this region is continually replenished by electrons from the cathode 30. The DC current generated by electrons collected by tubular body 12 is directly proportional to the gas pressure in the device. Meter 50 (shown in FIG. 1) is electrically connected to the tubular body 12 to measure the DC current and can be calibrated as a function of pressure to indicate the gas pressure within the tubular body 12.

The gas pressure measurement device described can be attached to a port communicating with the interior of a vacuum-type device such as a traveling-wave tube to measure and monitor the gas pressure therein. Since gas pressure in a traveling-wave tube affects its performance, this gas pressure measurement device provides a simple way to determine the gas pressure before the traveling-wave tube is turned on.

Figure 3:
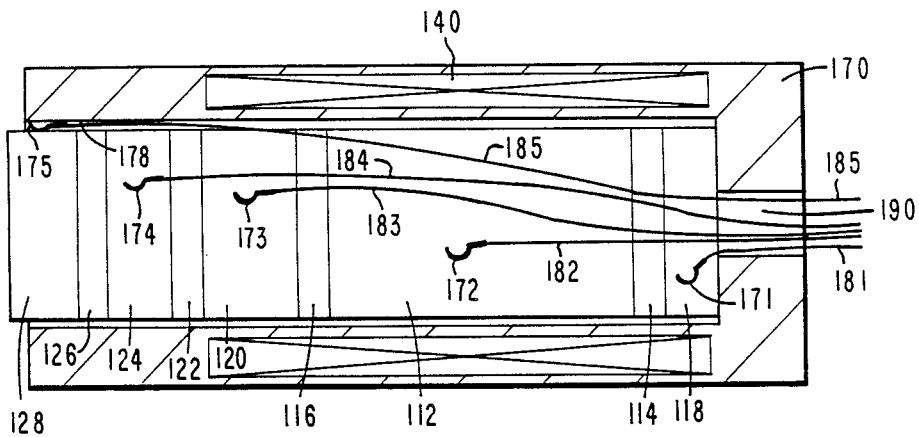
FIG. 3 is a partially broken-away sectional view of an alternate embodiment of the invention.

A further embodiment of the invention is shown in FIG. 3. Components in the embodiment of FIG. 3 which are the same as or equivalent to respective components in the embodiment of FIG. 1 are designated by the same second and third reference numeral digits as their corresponding components in FIG. 1, along with the addition of a prefix numeral "1". The magnet 40 may be embedded in a cup-shaped boot which can be slideably inserted over the tubular body. Cup-shaped boot may be made of potted material or other insulating material, for example. Five spring-type electrical contacts 171, 172, 173, 174 and 175 can be securably attached to the annular inner wall 178 of the boot 170 to make electrical contact with the reflector end cap 118, tubular body 112, shield element 120, cathode electrode member 124 and cathode electrode member 128, respectively. These spring-type electrical contacts may be bonded to the annular inner wall 178 by epoxy, for example. Wires 181, 182, 183, 184 and 185 are respectively attached to the spring-type electrical contacts and extend along the inside of the boot, exiting through a hole 190 in the boot 170. Boot 170 provides a quick electrical connect-disconnect means for the gas pressure measurement device.

Although the invention has been shown and described with reference to particular illustrated embodiments, nevertheless, various changes and modifications obvious to a person skilled in the art to which the invention pertains is deemed to lie within the purview of this invention.

What is claimed is:

1. A device for measuring gas pressure, comprising:
   a tube defining an elongated hollow chamber along its longitudinal axis;

a cathode located at one end of said tube for emitting electrons into said elongated hollow chamber;

electron shield means disposed near said one end of said tube;

electron reflector means disposed near the other end of said tube;

magnet means disposed about said tube for providing a magnetic field with said hollow chamber;

means for biasing said electron reflector means and said electron shield means such that electrons within said chamber near said shield means and said reflector means, respectively, are reflected substantially longitudinally toward the central region of said elongated hollow chamber; and means calibrated as a function of pressure for measuring electrical current generated by electrons reaching said tube.

2. The device defined in claim 1 further comprising insulating means for electrically isolating said electron shield means and said electron reflector means from said tube.

3. The device defined in claim 1 wherein said magnet means is a solenoid magnet.

4. The device defined in claim 2 wherein said electron reflector means is biased at a potential lower than said electron shield means.

5. The device defined in claim 4 wherein said electron shield means is a conductive annular ring disposed about said cathode.

6. The device defined in claim 5 wherein said electron reflector means is a conductive plate.

7. The device defined in claim 6 wherein said insulating means are two insulating spacers, one of said spacers being disposed between said electron shield means and said one end of said tube, and the other spacer being disposed between said electron reflector means and said other end of said tube.

8. The device defined in claim 7 wherein said two insulating spacers are annular ceramic rings.

9. The device defined in claim 5 wherein said electron reflector is a conductive screen.

10. A device for measuring gas pressure in traveling-wave tubes comprising:

an electrically conductive tubular body having an axial bore therethrough and having an entry end and another end;

a cathode disposed near the entry end of said tubular body for dispensing electrons into the axial bore of said tubular body said cathode having a voltage;

two insulating spacers, a first one of said two insulating spacers being attached to said entry end, and a second one of said two spacers being attached to said other end;

an electrically conductive shield element attached to said first one of said insulating spacers;

an electrically conductive reflector element attached to said second one of said insulating spacers;

means for applying a negative voltage relative to said cathode voltage to said reflector element and shield element such that electrons traveling axially along said axial bore are reflected back into said axial bore;

a magnet disposed about the tubular body for generating a longitudinally extending magnetic field within said axial bore; and means calibrated as a function of pressure for measuring electrical current generated by electrons impinging upon said tubular body, thereby indicating the pressure of the gas within the axial bore of said tubular body.

11. The device defined in claim 10 wherein said reflector element is biased more negatively than said shield.

12. The device defined in claim 11 wherein said magnet is a solenoid magnet.

13. The device defined in claim 10 wherein said cathode is a thermionic emission cathode and further including means for applying a voltage to said thermionic cathode.

14. Pressure measurement apparatus, comprising:

an elongated conduit having an axial bore therethrough defining an axis therein;

magnet means disposed about said chamber for providing a magnetic field therein along said axis;

means for introducing electrons into said elongated conduit substantially in a direction along said axis;

two electrodes, one at each end of said axial bore, said electrodes being negatively biased for confining said electrons in said elongated conduit; and electrical current measuring means electrically coupled to said hollow chamber and calibrated for measuring pressure as a function of electrical current.

15. The pressure measurement apparatus defined in claim 14 wherein one of said electrodes is more negatively biased than the other.

16. The pressure measurement apparatus defined in claim 15 wherein said magnetic means is a solenoid magnet.

17. The pressure means apparatus defined in claim 15 wherein said means for providing electrons is a dispenser cathode.

18. The pressure means apparatus defined in claim 17 wherein said dispenser cathode contains thoriated tungsten.

* * * * *